United States Patent
Apostolopoulos et al.

(10) Patent No.: US 9,217,451 B2
(45) Date of Patent: Dec. 22, 2015

(54) NON-COMPLEX CABLE TO PANEL CONNECTOR WITH INSEPARABLE PARTS

(71) Applicants: Lambros Apostolopoulos, East Aurora, NY (US); Paul Apostolopoulos, Clarence, NY (US)

(72) Inventors: Lambros Apostolopoulos, East Aurora, NY (US); Paul Apostolopoulos, Clarence, NY (US)

(73) Assignee: Paul Kristen, Inc., Tonawanda, NY (US)

( * ) Notice: Subject to any disclaimer, the term of this patent is extended or adjusted under 35 U.S.C. 154(b) by 0 days.

(21) Appl. No.: 14/331,505

(22) Filed: Jul. 15, 2014

(65) Prior Publication Data

US 2014/0328619 A1    Nov. 6, 2014

Related U.S. Application Data

(63) Continuation-in-part of application No. 12/884,418, filed on Sep. 17, 2010.

(60) Provisional application No. 61/846,449, filed on Jul. 15, 2013.

(51) Int. Cl.
  *F16B 9/02* (2006.01)
  *E01D 19/10* (2006.01)
  *E04G 3/00* (2006.01)

(52) U.S. Cl.
  CPC ............. *F16B 9/026* (2013.01); *E01D 19/106* (2013.01); *E04G 3/00* (2013.01); *Y10T 403/7188* (2015.01)

(58) Field of Classification Search
  CPC ......... F16B 9/026; E04G 3/00; E01D 19/106; Y10T 403/7188
  See application file for complete search history.

(56) References Cited

U.S. PATENT DOCUMENTS

| 629,935 | A | * | 8/1899 | Sturgis | 14/18 |
|---|---|---|---|---|---|
| 1,697,977 | A | * | 1/1929 | Henryson | 211/119.16 |
| 3,135,351 | A | * | 6/1964 | Economos et al. | 182/57 |
| 5,730,248 | A | * | 3/1998 | Apostolopoulos | 182/150 |
| 5,921,346 | A | * | 7/1999 | Apostolopoulos | 182/150 |
| 5,957,239 | A | * | 9/1999 | Marshak | 182/150 |
| 6,003,634 | A | * | 12/1999 | Apostolopoulos | 182/150 |
| 6,135,240 | A | * | 10/2000 | Apostolopoulos | 182/150 |
| 6,138,793 | A | * | 10/2000 | Apostolopoulos | 182/150 |
| 6,227,331 | B1 | * | 5/2001 | Apostolopoulos | 182/150 |
| 6,264,002 | B1 | * | 7/2001 | Apostolopoulos | 182/150 |
| 6,302,237 | B1 | * | 10/2001 | Apostolopoulos | 182/150 |
| 6,386,319 | B2 | * | 5/2002 | Apostolopoulos | 182/150 |
| 6,523,644 | B2 | * | 2/2003 | Apostolopoulos | 182/222 |
| 2001/0040070 | A1 | * | 11/2001 | Apostolopoulos | 182/150 |
| 2002/0029932 | A1 | * | 3/2002 | Apostolopoulos | 182/150 |
| 2002/0092706 | A1 | * | 7/2002 | Apostolopoulos | 182/150 |
| 2003/0127287 | A1 | * | 7/2003 | Apostolopoulos | 182/150 |
| 2004/0117928 | A1 | * | 6/2004 | Apostolopoulos | 14/77.1 |
| 2008/0313865 | A1 | * | 12/2008 | Hatsios | 24/135 R |

* cited by examiner

*Primary Examiner* — Victor MacArthur
(74) *Attorney, Agent, or Firm* — James C. Simmons

(57) ABSTRACT

A scaffolding connector. A first part includes a first plate, a first rod portion extending downwardly therefrom then upwardly to define a cradle, and a second rod portion extending upwardly therefrom then downwardly into close proximity therewith. A second part includes a second plate inseparable from the second rod portion. The first and second plates are positionable to together overlie an opening in a panel with an underlying cable received in the cradle. The terminal end portion is receivable in an aperture in the second plate so that a nut can be applied thereto for connecting the cable to the panel to define an attached state between the first and second parts and wherein a detached state between the first and second parts is defined when the terminal end portion is not received in the aperture. The first and second parts are inseparable in each of the attached and detached states.

19 Claims, 1 Drawing Sheet

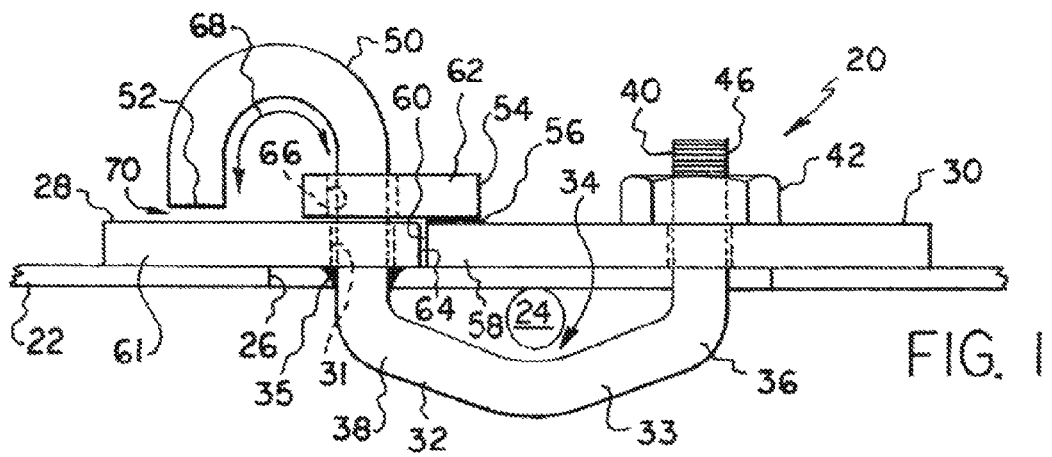
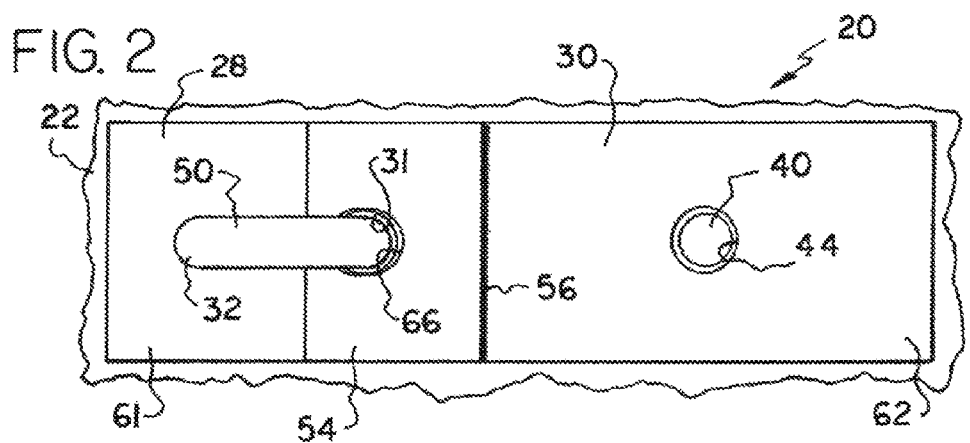
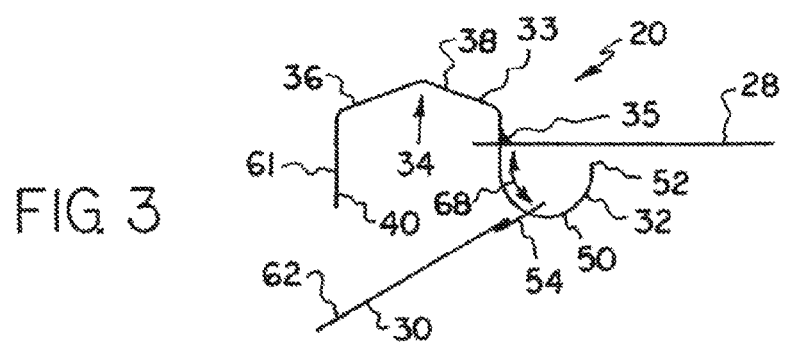

NON-COMPLEX CABLE TO PANEL CONNECTOR WITH INSEPARABLE PARTS

This application is a continuation-in-part of application Ser. No. 12/884,418, filed Sep. 17, 2010, and the priority of provisional application 61/846,449, filed Jul. 15, 2013, is hereby claimed, and both of the above applications are hereby incorporated herein by reference.

The present invention relates generally to bridge platforms or other scaffolding. More particularly, the present invention relates to scaffolding wherein panels are supported by cables which are attached at their ends to bridge or other structure. Such a platform or scaffolding is illustrated in my prior U.S. Pat. Nos. 6,523,644; 6,386,319; 6,302,237; 6,264,002; 6,227,331; 6,138,793; 6,135,240; 6,003,634; 5,921,346; and 5,730,248, all of which are incorporated herein by reference.

Such a platform structure requires that the cables, which pass underneath and support the panels, be securely connected releasably to the panels. One such connector which has served this function well is illustrated, for example, in FIGS. 10 to 15 of my aforesaid U.S. Pat. No. 6,135,240 and in FIGS. 15 to 17 of my aforesaid U.S. Pat. No. 6,523,644, wherein the connector comprises a plate which engages the upper surface of a panel, and a generally U-shaped member which is attached to the plate to extend downwardly therefrom to be received in a panel opening and to receive the cable. The free end of the member is threadedly attached to another plate wherein the two plates generally cover the opening with the cable securely received within (between the legs of) the U-shaped member, as more fully described in my aforesaid U.S. Pat. Nos. 6,135,240 and 6,523,644.

My prior U.S. Pat. No. 6,264,002 (see FIG. 21 thereof) discloses a panel-cable fastener, which also works well, wherein an arcuate member is received in a panel opening, receives the cable, and bears against the under surface of the panel, and a lever is rotatably connected to the arcuate member to bear against the upper surface of the panel to secure the connection of the cable to the panel.

Other art which may also be of interest includes U.S. Pat. Nos. 5,957,239; 6,568,874; 6,755,590; 6,860,672; 4,348,128; 4,525,096; 5,119,529; 6,948,703; and 5,409,339 all of which are incorporated herein by reference.

While the above-discussed connector in my aforesaid U.S. Pat. Nos. 6,135,240 and 6,523,644 has served well, nevertheless it requires two parts to be assembled as well as a nut which must be screwed onto the free end of the member, i.e., a total of three separate parts as well as an electric or other wrench for applying the nut sufficiently tight. Likewise, the connector of my aforesaid U.S. Pat. No. 6,264,002 requires two parts to be assembled as well as a pin (or nut and bolt) for added safety, a total of two or more separate parts.

The aforesaid parent application, published Apr. 14, 2011, as published application 2011/0085854, discloses a connector of inseparable parts wherein a pair of plates are hingedly connected to be positionable in a planar generally end-to-end relation to generally overlie an opening in a panel, one plate having an arcuate member attached thereto to extend below the opening and extend back through a slot in the other plate to receive an underlying cable, and the receipt secured by a wedge member which is wedgingly received between the free end of the member and the upper surface of the other plate and which is inseparable from the hinged plates. Further examples of panel to cable connectors having inseparable parts are found in FIGS. 14 to 38 thereof. While these inseparable connectors have been found to work well, nevertheless there is a degree of complexity associated therewith which makes them not only expensive to produce but may also result in increased weight for a worker to carry around and may also result in increased maintenance and repair requirements.

It is accordingly an object of the present invention to provide a simplified connector whose major parts are inseparable.

It is another object of the present invention to provide such a connector which is inexpensive to produce, light weight, and rugged so that maintenance and repair requirements are minimized.

In order to provide such a simplified connector, in accordance with the present invention, a first rod portion of a first part extends from the lower surface of a first plate and is generally U-shaped or arcuate thereby defining a cradle for receiving a cable between the first rod portion and at least one panel and has a second rod portion which loops around from the upper surface of the first plate so that its free end (or otherwise an intermediate portion thereof) is closely adjacent the plate (it may be so closely adjacent that it touches or engages the plate). Both rod portions (which may comprise a single rod which passes through an aperture in the first plate) are welded (or otherwise suitably permanently or non-detachably attached) to the first plate. A second part has a second plate which has an aperture for receiving a threaded terminal end portion of the first rod portion after which a nut may be applied to the terminal end portion for attaching the first and second parts for thereby connecting the cable to the at least one panel. The second part has another aperture in which the second rod portion is received so that the second part is inseparable from the second rod portion and so that the second part is able to "swing" therefrom so that it can be conveniently disposed out-of-the-way to allow the cable to be more easily cradled.

The above and other objects, features, and advantages of the present invention will be apparent in the following detailed description of the preferred embodiment(s) thereof when read in conjunction with the accompanying drawings wherein the same reference numerals denote the same or similar parts throughout the several views.

BRIEF DESCRIPTION OF THE DRAWINGS

FIG. 1 is a side elevation view of a connector, which embodies the present invention, connecting a supportive cable to a panel of a platform.

FIGS. 2 is a plan view thereof, shown without the nut of FIG. 1.

FIG. 3 is a schematic illustration thereof, not in use, illustrating the inseparable feature thereof, wherein one part is illustrated swinging from the other part.

DETAILED DESCRIPTION OF THE PREFERRED EMBODIMENT(S)

Referring to the drawings, there is illustrated generally at 20 a connector or deck clip composed or steel or other suitable metal or strong rigid material for connecting a platform panel 22 to an underlying supportive cable 24. It should be understood that the panel 22 is one of a series of panels laid side-by-side and/or end-to-end to form a platform for conducting maintenance work on a bridge or to otherwise form a scaffolding platform, and the cable 24 is one of a series of parallel cables which underlie and support the panels 22 and the ends of which are secured to portions of the bridge or other structural portions or otherwise suitably secured, as described in more detail in my aforesaid patents. One or more openings or slots, one illustrated at 26, are provided in the panel 22 for use in connecting the panel 22 to the cable 24, as will be described in greater detail hereinafter. It should also be understood that up to as many as four (or more) panels may overlap with the result that aligned openings may be provided in all the overlapping panels, with the result that a single connector connects all such overlapping panels to the underlying cable.

The connector 20 includes first and second parts 61 and 62 respectively which respectively comprise first and second plates 28 and 30 respectively. These plates 28 and 30 are sized to together, while lying end-to-end, overlie and extend beyond the slot 26 at each end thereof lengthwise. An elongate rod 32 (which may be circular in cross-section or otherwise suitably shaped and need not be of uniform size in cross-section over its length) is received in an aperture, illustrated at 31, in the first plate 28 and is welded or otherwise suitably permanently or non-detachably attached to the first plate 28 as at weldment illustrated at 35. The rod 32 has a generally U-shaped or arcuate (or otherwise suitably shaped) portion 33 which emanates from the lower surface of the first plate 28 at the weldment 35 to be receivable within the slot 26 for receiving the cable 24 in the cradle, illustrated at 34, between the legs 36 and 38 thereof. Since the panel 22 may overlap with 1 to 3 other panels, there may be from 1 to 4 such slots 26 in which the rod 32 is received for attaching 1 to 4 panels 22 respectively to the cable 24, only one such panel 22 and its slot 26 being illustrated for ease of illustration. The slot 26 is sized to allow the U-shaped portion 33 to be manipulated into position with the leg 38 extending below the panel 22 suitably to allow the underlying cable 24 to be received within the cradle 34 and then to allow the terminal end portion 40 to pass upwardly through an aperture, illustrated at 44, in the second plate 30 to extend above the panel 22 in position for securing the connector by means such as a suitable nut 42 applied to threads 46 on the portion 40, with the cable 24 securely received between the cradle 34 and the one or both of the plates 28 and 30 (for example, as illustrated, between the cradle 34 and primarily the second plate 30).

The rod 32 has a second portion 50 which emanates from the upper surface of the plate 28, curves or loops around and terminates at terminal end 52 which is closely adjacent to the plate 28, i.e., it may even touch or engage the plate 28. The term "closely adjacent" will be defined hereinafter. It should however be understood that it need not necessarily be the terminal end which is closely adjacent the plate 28. For example, an embodiment is envisioned in which the second rod portion 50 extends to a point closely adjacent the plate 28 then reverts away from the plate 28 to its terminal end, with the result that an intermediate portion of the second rod portion 50 is what is closely adjacent the plate 28.

In order to allow the plates 28 and 30 to have freedom of movement relative to each other so that they may be manipulated into the position illustrated in FIGS. 1 and 2, the plates 28 and 30 are unattached to each other, as the word "unattached" is defined hereinafter. Of course, it should be understood that the plates 28 and 30 (thus the parts 61 and 62) do become attached by application of the nut 42 to secure the cable to the panel.

Thus, a plate 54 is attached or detachably attached, such as by welding, as illustrated at 56, or by bolting to an end portion 58 of plate 30 to extend beyond the corresponding end 60 of plate 30 so that the part 62 comprising plates 30 and 54 may be manipulated into the position illustrated in FIGS. 1 and 2 wherein the plate end 60 abuts or is closely adjacent to the corresponding end 64 of plate 28 and wherein the plate 54 overlies the corresponding end portion of the plate 28. Plate 54 has an aperture, illustrated at 66, through which the rod portion 50 passes. When thusly in this position illustrated in FIGS. 1 and 2, the aperture 66 aligns with aperture 31.

In order to maintain the unattached parts 61 and 62 as a unit so that one of them is not lost, in accordance with the present invention, the parts 61 and 62 are arranged so that they are inseparable, as the word "inseparable" is defined hereinafter. Thus, in order to provide such inseparability of the unattached plates 28 and 30 (or parts 61 and 62), the end portion 50 of rod 32 is received in aperture 66 so that the plate 54 (and accordingly the part 62) may be slid along the length of the rod end portion 50, as illustrated at 68, so that it may flexibly assume various positions (relative to plate 28) including those positions illustrated in FIGS. 1 and 2 on the one hand and in FIG. 3 on the other hand. The aperture 66 is suitably enlarged relative to rod portion 50 to easily allow such sliding movement.

As used herein and in the claims, the term "closely adjacent" is defined as touching or engaging or being so close that the resulting gap is so small that a specified member cannot pass there through. In the present application and the claims, the specified member is the plate 54. Thus, the gap, illustrated at 70, is seen in FIG. 1 to be so small that the plate 54 cannot pass there through. Thus, the gap is smaller than a thickness of the plate 54. Accordingly, the terminal end 52 is, in accordance with the definition, closely adjacent the plate 28.

As used herein and in the claims, the term "attached," with respect to two or more parts, refers to and are defined as a fastening of the parts in such a manner that they are fixed firmly relative to each other, such as by welding or bolting, whereby they are immovable relative to each other. As used herein and in the claims, the term "unattached," with respect to two or more parts, refers to and is defined as a relationship between the parts in such a manner that they are not attached to each other. As used herein and in the claims, the term "inseparable," with respect to two or more parts, is defined as parts which, during normal use for their intended purpose, cannot be parted from close proximity to each other, whether or not they are attached or attachable or in contact or touching each other. Thus, in accordance with the above definitions, two or more parts may be inseparable but not be attached, and two or more parts may be both detachably attached and inseparable. Also in accordance with the above definitions, two or more parts may be assembled to be inseparable and disassembled to be separated, and while they are assembled to be inseparable while being used for their intended purpose, they are inseparable, as that term is defined, even though they may later be disassembled to be separated for other purposes such as for maintenance or repair. Thus, as is apparent from FIGS. 1 and 2, the part 62 may be positioned so as not to touch the other part 61 and thus is unattached thereto, yet it is still inseparable therefrom.

In accordance with an alternative embodiment of the present invention, the member 32 may comprise two parts each welded (or otherwise suitably attached) to the plate 28, one part extending below the plate 28 and the other part extending above the plate 28.

In order to make the connector 20, the rod 32 is received in the aperture 31, then is received in the aperture 66 of portion 54 and the member 32 manipulated to a position, as illustrated in FIG. 1, such that the gap, illustrated at 70, between the end 52 and plate 28 is desirably reduced (and may be reduced to zero, wherein the parts touch) so that the portion 54 cannot be removed or separated from the connector at the gap 70. Then, the weld 35 is applied to fixedly attach the member 32 to the plate 28 and to fix the resulting position of the end 52 relative to the plate 28, thus fixing the desirably reduced gap 70.

The following example of a connector 20 is for exemplary purposes only and not for purposes of limitation. All parts are made of steel. The plates 28, 30, and 54 each have a width of about 1 ½ inches and a thickness of about 3/16 inch. The plates 28, 30, and 54 have lengths of about 4 inches, 5 ¼ inches, and 1 ½ inches respectively, with an overlap between plates 30 and 54 of about ¼ inch. The apertures 31 and 44 each have a diameter of about 9/16 inch. The aperture 44 is spaced from the edge 60 of plate 30 a distance of about 1 ¾ inches. The aperture 31 is spaced from the edge 64 of plate 28 a distance of about ¼ inch. The rod 32 is composed of round stock having a diameter of about 7/16 inch, extends above plate 28 a distance of about 1 ¼ inch, and extends below plate 30 a distance of about 1 ¼ inch. The aperture 66 is oblong, having a major diameter (in a direction longitudinally of the connector 20) of about 7/8 inch and a minor diameter of about 9/16 to allow the desired freedom of movement of the part 62. All of the apertures are located centrally of their respective plates. The aperture 66 is spaced from the edge 74 of plate 54 a distance of about 3/16 inch and from the opposite edge of plate 54 a distance of about ½ inch to allow adequate play longitudinally for the aperture 44 to easily receive end portion 40. When the connector 20 is in use as in FIGS. 1 and 2, the cradle 44 has a depth (centrally thereof) of about ¾ inch and a span longitudinally of about 2 inches, and the rod 32 extends vertically below each of the plates 28 and 30 a distance of about ½ inch before being bent or curved to form the respective legs 36 and 38, which slant downwardly to join at a central apex, wherein the cradle 44 is considered suitably sized to easily receive the cable 24. The gap 70 is about 1/16 inch, which is sufficiently small to render the plate 54 and thus the part 62 inseparable from the part 61, whereby all the major parts of the connector 20 are desirably and advantageously inseparable.

In order to connect the cable 24 to the overlying panel 22 (or panels), in accordance with the present invention, the part 62 is moved to an out-of-the-way position, as illustrated at 68 in FIG. 3, the rod 32 is then moved downwardly into and below slot 26 and the cable 24 grasped within the cradle 34, and the end portion 40 inserted upwardly through the slot 26. Then, the part 62 is moved, as illustrated at 68, so that the end portion 40 is received within its aperture 44. Finally, the nut 42 is applied to firmly attach the inseparable parts 61 and 62 (which firmly attaches the rod 32 and the plates 28 and 30) with the cable 24 securely retained within the cradle 34.

It should be understood that, while the present invention has been described in detail herein, the invention can be embodied otherwise without departing from the principles thereof, and such other embodiments are meant to come within the scope of the present invention as defined by the appended claims.

What is claimed is:

1. A connector for connecting at least one panel to an underlying cable, the connector comprising first and second parts;
    said first part including a first plate portion having upper and lower surfaces, a first rod portion which extends downwardly from said first plate portion then upwardly to define a cradle and which has a terminal end portion which is threaded to receive a nut, and a second rod portion which extends upwardly from said first plate portion then downwardly into close proximity with said first plate portion;
    said second part including a second plate portion which is inseparable from said second rod portion and which has an aperture for receiving said terminal end portion of said first rod portion;
    whereby said first and second plate portions are positionable to together overlie an opening in an at least one panel with a cable received in the cradle between said first rod portion and at least one of said first and second plate portions;
    and wherein said terminal end portion of said first rod portion is receivable in said aperture so that a nut can be applied thereto for thereby connecting said cable to said at least one panel and to thereby define a latched state between said first and second parts and wherein an unlatched state between said first and second parts is defined when said terminal end portion is not received in said second plate portion aperture;
    and wherein said first and second parts are inseparable in each of said latched and unlatched states.

2. A connector according to claim 1 wherein said first and second rod portions are welded to said first plate portion.

3. A connector according to claim 1 wherein said first plate portion has an aperture and wherein said first and second rod portions comprise a single rod which passes through said first plate portion aperture and which is non-detachably attached to said first plate portion.

4. A connector according to claim 3 wherein said single rod is welded to said first plate portion.

5. A connector according to claim 1 wherein said second part further includes a third plate portion which is welded to an upper surface of said second plate portion so as to be positionable to partially overlie said first plate portion when the connector is in said latched state and which has an aperture in which said second rod portion is received, wherein said third plate portion aperture is sized such that said third plate portion is movable along said second rod portion when the connector is in said unlatched state.

6. A connector according to claim 1 further comprising a nut which is threadedly receivable on said terminal end portion for attaching said first and second parts.

7. A connector for connecting at least one panel to an underlying cable, the connector comprising first and second parts;
    said first part including a first plate portion having upper and lower surfaces, a first rod portion which extends downwardly from said first plate portion then upwardly to define a cradle and which has a terminal end portion which is threaded to receive a nut, and a second rod portion, wherein said first plate portion and said first and second rod portions are non-detachably attached;
    said second part including a second plate portion and has a first aperture for receiving said terminal end portion of said first rod portion and a second aperture in which said second rod portion is received;
    whereby said first and second plate portions are positionable to together overlie an opening in an at least one panel with a cable received in the cradle between said first rod portion and at least one of said first and second plate portions;
    and wherein said terminal end portion of said first rod portion is receivable in said first aperture so that a nut can be applied thereto for thereby connecting a cable to the at least one panel;
    and wherein said second rod portion extends upwardly from said first plate portion then downwardly into close proximity with said first plate portion so that said second part cannot be removed from said second rod portion.

8. A connector according to claim 7 wherein said first and second rod portions are welded to said first plate portion.

9. A connector according to claim 7 wherein said first plate portion has an aperture and wherein said first and second rod portions comprise a single rod which passes through said first plate portion aperture.

10. A connector according to claim 9 wherein said single rod is welded to said first plate portion.

11. A connector according to claim 7 wherein said second part further includes a third plate portion which is welded to an upper surface of said second plate portion so as to be positionable to partially overlie said first plate portion when said terminal end portion is received in said first aperture and a nut applied thereto and which has an aperture in which said second rod portion is received, wherein said third plate portion aperture is sized such that said third plate portion is movable along said second rod portion.

12. A connector according to claim 7 further comprising a nut which is threadedly receivable on said terminal end portion for attaching said first and second parts.

13. A connector according to claim 7 wherein a latched state is defined between said first and second parts when said terminal end portion is received in said first aperture and a nut applied thereto and wherein an unlatched state between said first and second parts is defined when said terminal end portion is not received in said first aperture;

and wherein said first and second parts are inseparable in each of said latched and unlatched states.

14. In combination with scaffolding which includes at least one panel having an opening therein and at least one cable underlying and supporting said panel, at least one connector for connecting said at least one panel to said cable, said at least one connector comprising first and second parts and a nut;

said first part including a first plate portion having upper and lower surfaces, said lower surface engaging said at least one panel, a first rod portion which extends downwardly from said first plate portion through said opening then upwardly to define a cradle and which has a terminal end portion which is threaded, and a second rod portion which extends upwardly from said first plate portion then downwardly into close proximity with said first plate portion;

said second part including a second plate portion which is inseparable from said second rod portion and which has an aperture in which said terminal end portion of said first rod portion is received and which engages said at least one panel;

whereby said first and second plate portions together overlie said opening in said at least one panel, and said cable is received in the cradle between said first rod portion and at least one of said first and second plate portions;

said nut threadedly received on said terminal end portion of said first rod portion thereby defining a latched state between said first and second parts and thereby connecting said cable to said at least one panel and wherein an unlatched state between said first and second parts is defined when said terminal end portion is not received in said second plate portion aperture;

and wherein said first and second parts are inseparable in each of said latched and unlatched states.

15. A connector according to claim 14 wherein said scaffolding is a platform erected to permit workers to perform work on a bridge.

16. A connector according to claim 14 wherein said first and second rod portions are welded to said first plate portion.

17. A connector according to claim 14 wherein said first plate portion has an aperture and wherein said first and second rod portions comprise a single rod which passes through said first plate portion aperture and which is non-detachably attached to said first plate portion.

18. A connector according to claim 17 wherein said single rod is welded to said first plate portion.

19. A connector according to claim 14 wherein said second part further includes a third plate portion which is welded to an upper surface of said second plate portion so as to partially overlie said first plate portion when the connector is in said latched state and which has an aperture in which said second rod portion is received, wherein said third plate portion aperture is sized such that said third plate portion is movable along said second rod portion when the connector is in said unlatched state.

* * * * *